March 21, 1967          G. L. CANN          3,309,873

PLASMA ACCELERATOR USING HALL CURRENTS

Filed Aug. 31, 1964          3 Sheets-Sheet 1

GORDON L. CANN,
INVENTOR.

BY HIS ATTORNEYS.

Spensley & Horn.

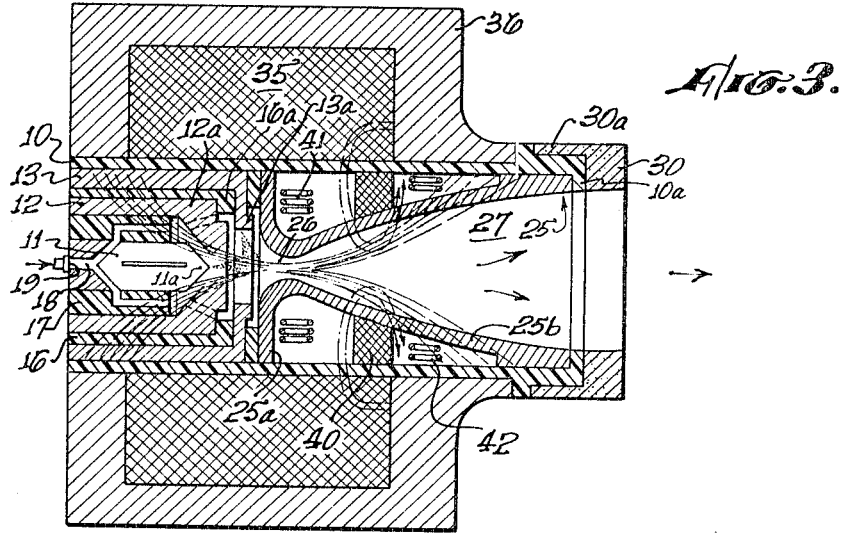
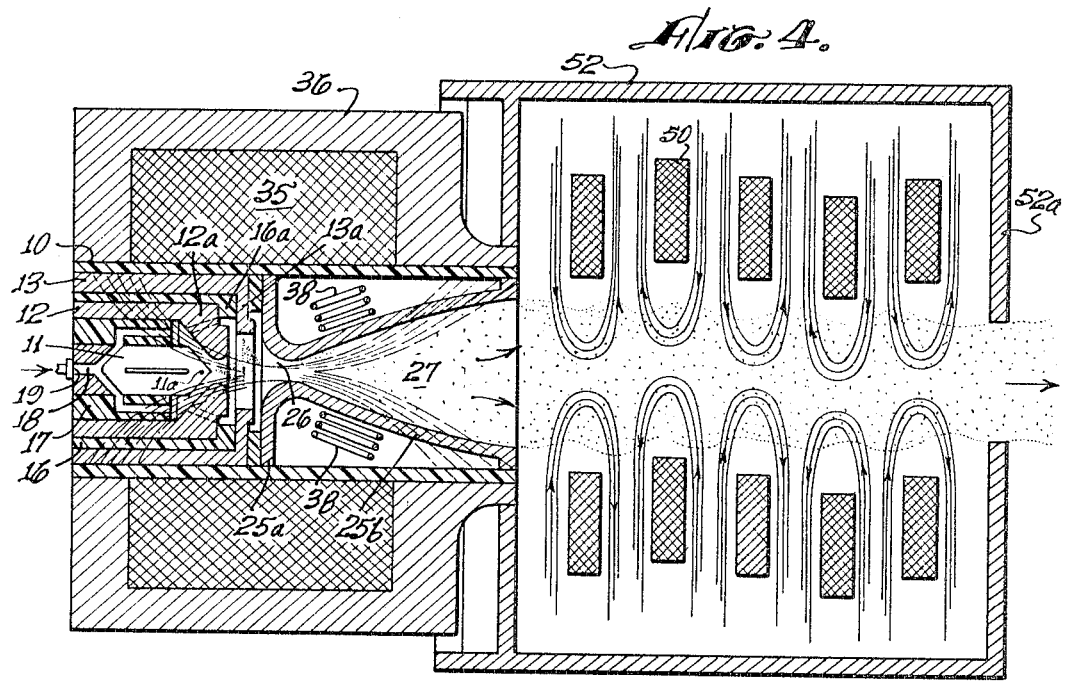

GORDON L. CANN,
INVENTOR.

BY HIS ATTORNEYS
Spensley & Horn 3,309,873
PLASMA ACCELERATOR USING HALL
CURRENTS
Gordon L. Cann, Laguna Beach, Calif., assignor to Electro-Optical Systems, Inc., Pasadena, Calif., a corporation of California
Filed Aug. 31, 1964, Ser. No. 394,383
5 Claims. (Cl. 60—203)

This invention relates to plasma accelerators and more particularly to electromagnetic accelerators utilizing Hall currents to achieve extremely high gas velocities. This is a continuation-in-part of my copending application Ser. No. 217,631, entitled "Plasma Accelerator Using Hall Currents," filed August 17, 1962, now Patent No. 3,243,954, and also assigned to the present assignee.

Plasma generating and accelerating devices in which an ionized gas plasma is accelerated to high velocities are recognized by science to possess great potential in certain applications. A particular application in which such devices could be of particular importance is in the field of space propulsion. The thrust of a space propulsion system is dependent upon the product of the propellant mass flow rate and the exhaust velocity relative to the vehicle. The current use of chemical rocket fuels entails a limitation on space flights because the propellant exit velocities are relatively low and large masses of propellant must be carried aloft. Considerable thought has been given to the use of an ionized gas plasma in space propulsion systems with a view toward increasing the exhaust velocity of the propellant, together with a substantial reduction in propellant weight and space requirements as compared with chemical propellants.

The standard present art method for accelerating an ionized gas plasma to high velocities is to pass the plasma through a crossed field channel accelerator in which electric and magnetic fields are maintained at right angles to each other and transverse to the "channel" into which the ionized gas is longitudinally injected. It is known that an electric field transfers energy to charged particles and that a magnetic field exerts a force on charged particles in motion relative to the magnetic field. When a magnetic field is established at right angles to a moving stream of electrically conductive fluid, an electric field is induced perpendicular to both the stream direction and the field lines. If an electric field is now applied in the same direction as the induced electric field, but stronger than the induced electric field, then a current flows in the conductive fluid in the direction of the applied electric field, which current interacts with the magnetic field to produce a force which is in the direction of the moving stream. In accordance with commonly used vector notations, the net current density is denoted by $j$ and the magnetic flux density denoted by B. Hence, the crossed-field channel accelerator is also known in the art as a $j \times B$ channel accelerator.

However, in a $j \times B$ channel accelerator, the electrical current does not actually flow perpendicular to the electrodes, but rather flows at some angle due to the phenomenon known as Hall effect. When the Hall potential is zero, the net resultant current is the combination of the "ordinary" currents and the Hall currents. Because of the angularity of the net resultant current flow between the electrodes, a force is applied to the gas stream deflecting the flow in the direction of the applied electric field, the angle of deflection changing with variations in gas pressure and in the strength of the applied magnetic field. Thus acceleration of a plasma jet in accordance with present art practices results in deflection as well as spreading of the jet, these characteristics being undesirable for use of the jet as a space propulsor because maximum thrust is obtainable only from a sharply focused jet containing no angular velocity components. Also, in the present art $j \times B$ channel accelerators, energy is initially transferred by collisions to the heavier particles. Due to the slow rate of energy transfer between electrons and heavy particles by elastic collisions, the electrons usually are heated until they can collide inelastically and ionize the atoms, thereby transferring a large fraction of the input electrical energy into a form of potential energy that is not easily recoverable. There is also a very high heat flux into the electrodes, causing them to erode at a relatively high rate.

The present invention is directed toward obviating the aforementioned disadvantages of present art channel accelerators by a novel plasma accelerator concept wherein the spiraling forces of the ordinary currents are minimized and the Hall currents utilized to provide the main axial accelerating force, an ionized gas plasma being accelerated without spreading of the jet while maintaining the electrodes at a relatively low temperature, the joule heating of the gas being converted into axial jet energy in the same region where the acceleration is occurring.

Accordingly, it is an object of the present invention to provide improved plasma accelerators.

It is also an object of the present invention to provide acceleration of an ionized gas plasma without any significant spreading or deflection of the jet.

It is another object of the present invention to provide an electromagnetic plasma accelerator in which the electrodes are maintained at a relatively low temperature to minimize electrode erosion and sputtering.

It is a further object of the present invention to provide a steady-state plasma accelerator in which Hall currents are used to provide an additional measure of acceleration.

It is yet another object of the present invention to provide an improved plasma accelerator in which the joule heating of the gas plasma is converted into axial jet energy.

It is a still further object of the present invention to provide an improved plasma accelerator in which tangential velocities are effectively cancelled by clockwise and counterclockwise acceleration components.

It is also an object of the present invention to provide methods and means for focusing a plasma jet and eliminating the angular momentum of the jet while accelerating it to high velocities.

The present invention objects are accomplished by at least partially ionizing a gas stream to form a plasma jet and injecting the jet axially into an accelerator channel throughout which is maintained an axial electric sheet discharge and an axisymmetric magnetic field in which the total radial components of the magnetic lines of force greatly predominate over the axial components. Tangential Hall currents are generated by the current density lines crossing the magnetic field lines, the Hall currents then interacting with the radial components of the magnetic field to impart axial acceleration to the gas. The tangential Hall currents also interact with the axial components of the applied magnetic field to produce radially inwardly directed forces which can provide an effective magnetic confinement scheme under certain conditions. The Hall electric field is effectively eliminated due to the impossibility of maintaining a tangential electric field. In the accelerating discharge, the electrons are forced to spiral due to the radial components of the applied magnetic field, the rotational force applied to the electrons upon entering the field being oppositely directed from the rotational force applied on leaving the field. Hence, the rotational forces cancel each other, thereby leaving only the axial Hall force for acceleration of the jet. Although the electrons spiral within the applied magnetic field the ions, being of much greater mass, are unaffected by the rotational forces and so carry the current and pick up momentum and energy directly from the electric fields. The ions simultaneously collide with the atoms and hence accelerate the plasma as a whole.

The novel features which are believed to be characteristic of the invention, both as to its organization and method of operation, together with further objects and advantages thereof will be better understood from the following description considered in connection with the accompanying drawing in which various embodiments of the invention are illustrated by way of example. It is to be expressly understood, however, that the drawing is for the purpose of illustration and description only, and is not intended as a definition of the limits of the invention.

In the drawing:

FIGURE 3 is an elevation view, in section, of a second embodiment of a plasma accelerator.

FIGURE 4 is an elevation view, in section, of a third embodiment of a plasma accelerator;

Figure 1:
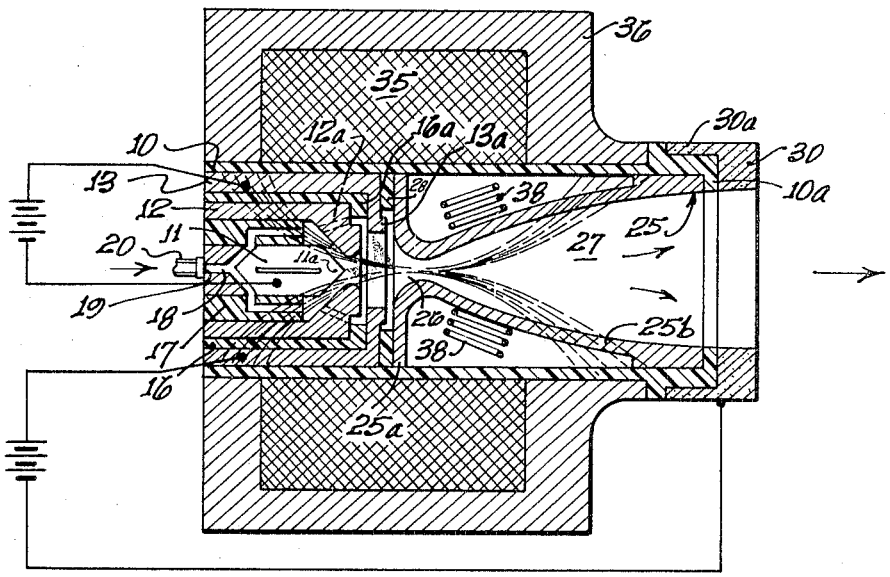
FIGURE 1 is an elevation view, in section, of a first embodiment of a plasma accelerator.

In general, electric discharges in gases tend to operate most satisfactorily in an axial symmetric configuration. Hence, the present invention concepts are applied to a gas confined to a channel having an applied axisymmetric magnetic field and through which an electric discharge is maintained in an axial direction. Various confinement techniques and configurations are possible in accordance with the particular operating characteristics for a given application. Various embodiments are shown in the drawings and will be explained in an order which will enable those skilled in the art to evolve additional embodiments utilizing the present invention concepts.

When working at relatively low plasma pressures in the accelerator channel, i.e., on the order of $10^{-4}$ to $10^{-5}$ mm. Hg, the tendency for the plasma current to concentrate itself into a filament along the central axis can be counteracted by establishing a transverse rotating magnetic field along the length of the accelerator channel, the magnetic field strength being merely adequate to prevent a current filament from forming along the axis. The first three presented embodiments are of this type. When working at higher plasma pressures, i.e., on the order of 1–10 mm. Hg, transverse rotating magnetic fields are ineffective and a center core body can be utilized to prevent concentration of the plasma current into a filament along the central axis, the fourth presented embodiment being of this type.

With reference now to the drawings, wherein like or corresponding parts are designated by the same reference characters throughout the several views, there is shown in FIGURE 1 a basic accelerator structure of the aforementioned low pressure type. According to FIGURE 1, an arc gap device is disposed within a tubular casing 10 of an insulating material. Coaxially disposed within the tubular casing 10, near one end thereof, are a cathode 11, an intermediate shaping electrode 12, and an anode 13. The intermediate electrode 12, and the anode 13 are maintained in coaxial alignment and electrically insulated from each other by a tube 16 of an electrical insulating material. The cathode 11 is mounted within a cylinder 17 of insulating material.

The cathode 11 is cylindrical in shape and defines a pointed end portion 11a. The cathode is constructed of a suitable metal, tungsten being presently preferred. The cathode 11 is coaxially encased within the insulating cylinder 17 with its pointed end portion 11a extending past the end of the insulating cylinder. A multi-branch gas inlet passageway 18 extends coaxially into the cathode 11 from an inlet port 19, with the various branches of the passageway extending radially outward and into the insulating cylinder 17 and then longitudinally within the cylinder to its innermost end. One end of a gas feedpipe 20 is coupled to the inlet port 19, the other end of the pipe being coupled to a suitable source of gas pressure, not shown.

The intermediate electrode 12 defines an angular end portion 12a projecting radially inward past the pointed end portion 11a of the cathode 11 for the purpose of directing gas emerging from the multi-branch passageway 18 radially inward past the pointed end portion 11a and through the aperture defined by the angular end portion 12a. The insulating tube 16 defines a radially inwardly directed flange 16a. The generally tubular anode 13 defines a radially inwardly directed flange portion 13a, the flange portion 13a extending past the flange 16a to define a ring anode. The intermediate electrode 12 and the anode 13 are constructed of a suitable electrically conductive material, copper being presently preferred.

Also disposed within the tubular casing 10 is a generally tubular conduit means 25 having a transversely extending end section 25a and a divergent frusto-conical section 25b. The end section 25a defines a sonic orifice 26 in coaxial alignment with the pointed end portion 11a of the cathode 11. The frusto-conical section 25b defines a supersonic expansion nozzle 27. The end section 25a of the conduit means 25 is positioned adjacent the flange portion 13a defining the ring anode and separated therefrom by an insulating ring 28.

The open volume defined between the pointed end portion of the cathode 11 and the end section of the conduit means 25 forms a gas chamber. Plasma is produced within the chamber by pumping gas under pressure through the inlet passageway 18 into the chamber and through an arc maintained between the cathode 11 and the anode 13, the plasma then passing through the sonic orifice 26 and expanded in the supersonic nozzle 27. The design and construction of such arc gap devices are well known in the art and hence will not be discussed in detail.

The end of the tubular casing 10 adjacent the outlet of the nozzle 27 defines a radially inwardly extending flange 10a, the flange terminating flush with the mouth of the nozzle. Disposed adjacent the flange 10 is a ring cathode 30 fabricated of copper or other suitable electrically conductive material. The cathode 30 has a tubular extension 30a, by means of which the ring cathode is securely maintained in coaxial alignment on the tubular casing 10. Wound about the tubular casing 10 is a magnetic field coil 35, the field coil comprising multiple layers of coil windings wound circumferentially about the tubular casing 10 and extending throughout the length of the arc gap device within the casing and past the orifice of the expansion nozzle. The field coil 35 is encased within a ferromagnetic shield 36 which serves to establish the axisymmetric flux path shown by the dotted lines in FIGURE 1.

Since the radial component of the magnetic field drops to zero along the axis of the device, there might be a tendency for the plasma current to concentrate itself into a filament along the central axis with the result that little happens except local heating of the gas along the axis. In order to prevent this occurrence, a transverse rotating magnetic field is established along the length of the accelerator, the field strength being merely adequate to prevent a current filament from forming along the axis. The transverse rotating magnetic field is provided by a plurality of coils 38 circumferentially disposed about the expansion nozzle.

In the operation of the device shown in FIGURE 1, an arc jet is utilized to heat and partially ionize gas flow which is then passed through the sonic orifice 26 and expanded in the supersonic nozzle 27. A second electric discharge is maintained along the length of the nozzle by striking a discharge from the ring cathode 30 at the nozzle outlet to the anode 13 of the first arc. An axisymmetric magnetic field is applied throughout the volume of the nozzle such that the field strength drops to a very small value at the nozzle outlet. A tangential Hall current will be induced that will interact with the applied magnetic field to produce axial and radial forces on the gas. There will also be a positive axial accelerating force on the gas due to the interaction of the radial component of the current with the tangential magnetic field induced by the axial current. There are four accelerating mechanisms acting upon the plasma passing through the accelerator structure of FIGURE 1. First, there is supersonic joule heating with expansion. Second, there is an expansion of the current density in the secondary electric discharge. Third, an axial volume force is created due to the Hall currents. Fourth, there is a conversion of rotational kinetic energy to axial kinetic energy through radial expansion. To facilitate a mathematical analysis of this apparatus, it will be assumed that the tangential magnetic field is negligibly small. As long as the applied field is over several hundred Gauss, this is a reasonable assumption when the axial current is of the order of a few hundred amperes.

The equations describing the current density are as follows:

$$j + \frac{\omega_e \tau_e}{|B|} j \times B - \frac{\omega_e \tau_e \omega_I \tau_I}{|B|^2}(j \times B) \times B \approx \sigma F_I \quad (1)$$

$$\frac{\omega_e \tau_e}{|B|} = \frac{\sigma}{|e|n_I} = \frac{|e|}{kT} D_{ea} \frac{nq_{ea}f_{ea}^2}{n_I q_{eI} f_{eI}^2 + n_a q_{ea} f_{ea}^2} \quad (2)$$

$$\frac{\omega_I \tau_I}{|B|} = \frac{|e|}{kT} D_{Ia} \frac{nn_a}{(n_a + n_I)^2} \quad (3)$$

$$F_I = E + \mu \times B + \frac{kT}{|e|}(\nabla \ln p_e + K_e \nabla \ln T) \quad (4)$$

Where, $j$=current density
$\omega$=particle cyclotron frequency
$\tau$=collision time of particle
$B$=magnetic field strength
$\sigma$=electrical conductivity of the gas
$F$=electromagnetic force per unit volume applied to gas generalized electric field term
$n$=particle density
$e$=charge on the electron
$k$=Boltzman's constant
$T$=temperature in degrees Kelvin
$D$=diffusion coefficient
$q$=cross-section of interaction
$f$=force coefficient
$E$=electric field
$\mu$=permeability of free space
$p$=pressure and where the subscripts $e$, $I$, $a$, respectively refer to electrons, ions, and atoms.

Figure 2:
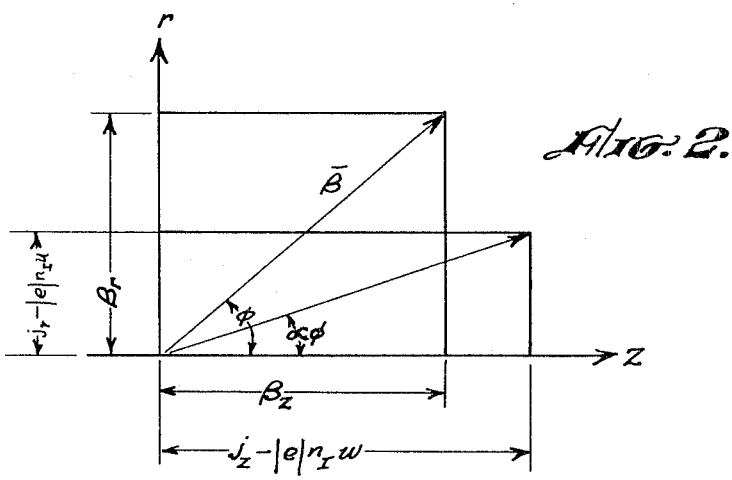
FIGURE 2 is a schematic diagram defining the various angles used in the mathematical analysis presented in the specification.

It is possible to solve exactly for the three components of the force per unit volume of gas by defining the angles as shown in FIGURE 2 of the drawing, wherein $\phi$ represents the angle of the magnetic field with respect to the axis. It is seen that as long as $\alpha\phi \ll 1$, a good solution will be obtained. The ideal solution is obtained when $\alpha\phi = 0$. The results are shown below:

$$F_z = \frac{(\omega_e\tau_e)^2 \sin^2\phi\left(1 - \frac{\tan\alpha\phi}{\tan\phi}\right)|e|n_I(E_z - E'_z)}{(1 + \omega_e\tau_e\omega_I\tau_I)\left[1 + \left\{\frac{(\omega_e\tau_e)^2}{1+\omega_e\tau_e\omega_I\tau_I} + \omega_e\tau_e\omega_I\tau_I\right\}\sin^2\phi\left(1-\frac{\tan\alpha\phi}{\tan\phi}\right)\right]} \quad (5)$$

$$-E'_z = \frac{kT}{|e|}\left(\frac{\partial \ln pe}{\partial z} + K_e\frac{\partial \ln T}{\partial z}\right) - vB\sin\phi - \frac{(1+\omega_e\tau_e\omega_I\tau_I \sin^2\phi)}{\omega_e\tau_e}wB + \omega_I\tau_I \sin\phi \cos\phi uB \quad (6)$$

$$F_r = -\cot\phi F_z \quad (7)$$

$$F_\theta = \frac{(1+\omega_e\tau_e\omega_I\tau_I)}{\omega_e\tau_e \sin\phi}F_z + |e|n_I \sin\phi wB\left(1 - \frac{u}{w}\cot\phi\right) \quad (8)$$

In these equations, $u$, $v$, and $w$ are the components of the mass velocity vector in the representative $r$, $\theta$ and $z$ directions. The expression $F_z$ can be greatly simplified if it is assumed that the pressure and magnetic field are chosen so that $$\left|\left\{\frac{(\omega_e\tau_e)^2}{1+\omega_e\tau_e\omega_I\tau_I} + \omega_e\tau_e\omega_I\tau_I\right\}\sin^2\phi\left(1-\frac{\tan\alpha\phi}{\tan\phi}\right)\right| \gg 1 \quad (9)$$

and $$\omega_e\tau_e\omega_I\tau_I > 1 \quad (10)$$

then $$F_z = \frac{|e|n_I}{1+(\omega_I\tau_I)^2}(E_z - E'_z) \quad (5a)$$

when $E'_z$ is the rather complicated back E.M.F. term shown in the Equation 6. Subject to the conditions indicated in Equations 10 and 9, a number of important conclusions can be drawn from Equation 5a.

(1) The axial acceleration is always in the direction of the applied electric field and is proportional to the potential drop of the discharge through the nozzle.

(2) The axial acceleration is independent of the direction of the applied magnetic field subject to the restriction of Equation 9.

(3) As long as $\omega_I\tau_I < 1$, the magnitude of the axial acceleration is independent of the magnitude of the applied magnetic field. However, the magnetic field must be strong enough so that the conditions specified in Equations 10 and 9 are maintained.

In addition to the axial acceleration, there are radial and tangential forces on the gas as indicated by Equations 8 and 7. When $\cot\phi > 0$, the radial force on the charged particles is directed inward when the axial force is accelerating the gas. In practice, this signifies that the beam of charged particles would contract when emerging from an axisymmetric magnetic field and would expand when entering such a field. The tangential component of the body force will induce a considerable amount of rotation in the gas. When the gas is continually expanding, some of this rotational energy will be recovered due to the necessity of conserving angular momentum.

Thus, in the accelerator embodiment shown in FIGURE 1 of the drawing, the tangential component of the body force, when the gas is expanded through the nozzle, is utilized to increase the total axial force or thrust developed. There is, however, a better method of increasing the total axial thrust. As shown by Equation 7, it is possible to reverse the angular acceleration by reversing the angle $\phi$. As long as $u/v \ll 1$, then it should be possible to accelerate the gas axially and impart very little angular velocity to it by utilizing a magnetic field that fringes strongly at both the inlet and the outlet, i.e., a magnetic field in which the total radial components of the magnetic lines of force greatly predominate over the total axial components. A plasma accelerator utilizing this principle is illustrated in FIGURE 3. The accelerator embodiment of FIGURE 3 utilizes the basic arc gap device and expansion nozzle of FIGURE 1, together with the axisymmetric field created by the field coil 35 and the ferromagnetic shield 36. To this basic structure has been added a fringe field coil 40 and a plurality of coils 41 and 42. The coils 41 are circumferentially spaced around the conduit means 25 between the end section 25a and the fringe field coil 40.

The coils 42 are circumferentially spaced around the conduit means 25 on the other side of the fringe field coil 40. The flux lines of the fringe field produced by the field coil 40 are shown in FIGURE 3 as a series of dot-dash lines. The magnetic field created by the coils 41 and 42 are fields which rotate around the circumference of the conduit means 25.

As the plasma enters the fringe magnetic field, there are components of acceleration in the following directions:

(1) A positive axial acceleration.
(2) A radial outward acceleration.
(3) A counterclockwise angular acceleration.

As the plasma leaves the fringe magnetic field, it again receives a positive axial acceleration. However, now the radial force is directed inwardly and the tangential acceleration is clockwise. By proper adjustment of the fringe and rotating magnetic fields, it is possible to focus the plasma into a well-defined jet at the mouth of the nozzle with negligible angular velocity components in the jet. Thus, the fringe magnetic field created by the field coil 40 provides an axial velocity increment to the plasma jet. An extension of this principle would be to utilize a plurality of fringe field coils to obtain an axial velocity increment from each of the fields. FIGURE 4 of the drawings shows such as accelerator embodiment.

The accelerator of FIGURE 4 is the basic low pressure embodiment of FIGURE 1 to which has been added a plurality of magnetic field coils 50 encased within a second cathode 52. The coils 50 are relatively closely spaced and are cyclically displaced from the central axis of the device in 90° steps to prevent a region of very low radial magnetic field from occurring along the center line to thereby prevent formation of a current filament along the central axis. Thus, the coils 50 provide the dual function of a plurality of fringing magnetic fields and rotating magnetic fields. The second cathode 52 defines a radially inwardly extending flange 52a to provide an exit nozzle for the device.

The hereinabove-described accelerator embodiments of FIGURES 1, 3 and 4 possess a number of practical advantages over the channel $j \times B$ accelerator and other steady state accelerating devices:

(1) The present invention structures obviate the problem of introducing a plasma into a magnetic field of an accelerator and then removing it from the field without causing deceleration or spreading of the jet.

(2) The joule heating of the gas is converted into axial jet energy in the expansion nozzle in the same region where the acceleration is occurring.

(3) The tangential velocities are cancelled by both clockwise and counterclockwise acceleration, hence, the back E.M.F. is minimized. In any case, independent of the magnitude of the back E.M.F., the axial electric field can adjust itself to maintain the axial discharge at all times. Hence, it should be possible to give an arbitrarily large velocity increment to the gas plasma by using multiple stages of acceleration.

(4) The current from the accelerating discharge enters the anode where the gas is comparatively cool and the pressure is high. For this reason, the electron energy at the anode surface is only a fraction of an electron volt. Moreover, the anode point of attachment is rotating rapidly due to the axial magnetic field in this region of the arc. All these factors tend to prevent local heating of the anode surface, and hence anode erosion and sputtering is minimized.

(5) The plasma jet is axially focused and angular momentum components are minimized, thereby rendering these accelerators especially suited for space propulsion.

In practical examples of the low pressure plasma accelerator embodiments of FIGURES 1, 3 and 4, the potential difference between the anode 13 and the first cathode 11 is typically on the order of from 40 to 150 volts, the power in the preionizing arc being within the range of from about 2 to about 50 kw. The primary purpose of the first arc is to ionize rather than to heat the gas. As stated hereinabove, there is no potential applied to the intermediate shaping electrode 12, its function being merely to channel the gas. The second cathode (ring cathode 30 in FIGURES 1 and 3 and cathode 52 in FIGURE 4) is maintained within the range of from about 200 to 1,000 volts below the anode, and therefore below the first cathode. The second cathode is at the outlet end in all of the embodiments and is insulated from the remainder of the charge. The discharge set up by the potential between the second cathode and the anode extends along the conducting channel, the current of this discharge being carried by the ions. The ions are being axially accelerated through the electrostatic potential and are being tangentially accelerated in a spiralling pattern by the radial component of the magnetic fields, the direction of the spiral depending upon the direction of the radial component of the magnetic fields which varies from coil to coil. Therefore, the tangential velocity component is cancelled out. An exhaust velocity of from 20,000 to 50,000 meters per second, or higher, is therefore obtained.

The gas is pumped in through the inlet port 19 under a pressure on the order from 2 to 3 atmospheres. The gas is ionized within the ionizing chamber and formed into a plasma and injected into the sonic nozzle with supersonic expansion. The plasma flows along the channel at the aforementioned relatively low pressure and is acted upon by the second discharge and the fringe magnetic fields. The discharge current is carried by the ions while the electrons are spiralling as they enter the channel. The direction of electron spiralling is reversed as the electrons traverse the channel, in accordance with the direction of the radial component of the alternating magnetic fields. Thus, although the ions are being axially accelerated through an electrostatic potential, they are also being tangentially accelerated in a spiral pattern by the radial component of the magnetic fields. The radial component of the magnetic field is adjusted to cancel the tangential velocity component.

Figure 5:
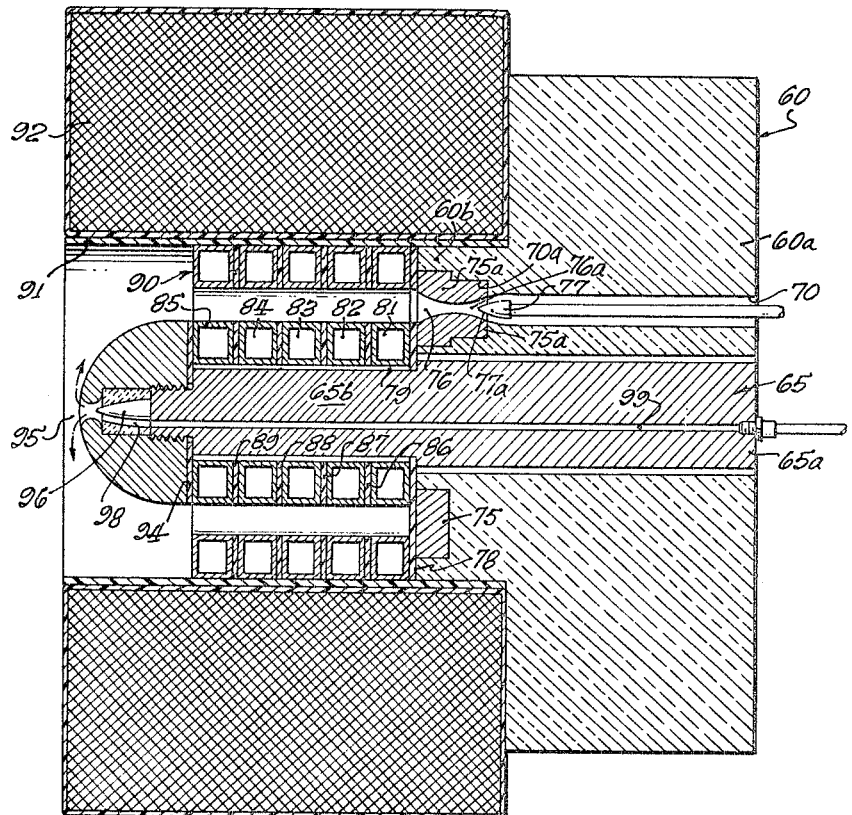
FIGURE 5 is an elevation view, in section, of a fourth embodiment of a plasma accelerator; and, FIGURE 6 is a partial perspective view of the embodiment of FIGURE 5.
Figure 6:
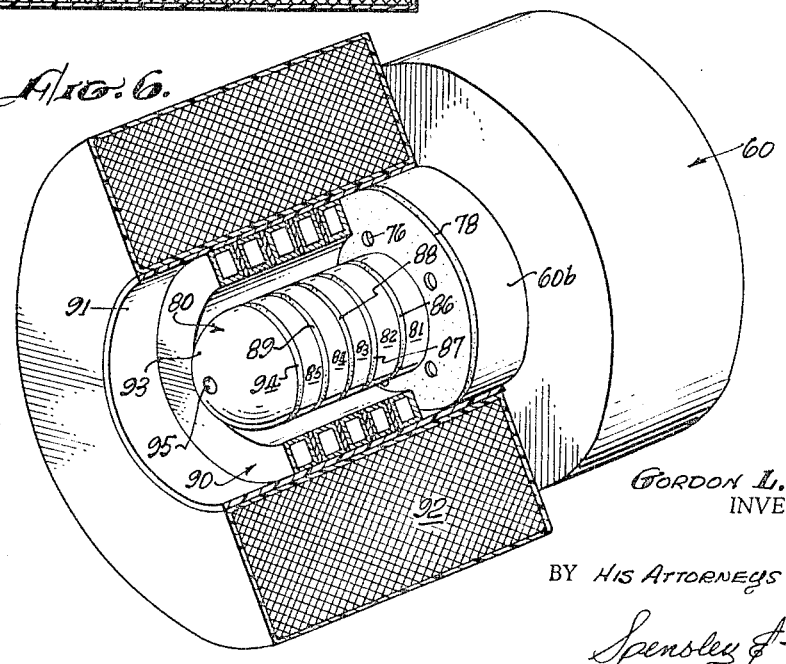

Turning now to FIGURES 5 and 6 of the drawings there are shown views of another embodiment of a plasma accelerator utilizing the present invention concepts, this fourth embodiment being intended for use at channel pressures on the order of from 1 to 10 mm. Hg. At these higher operating pressures rotating magnetic fields are generally ineffective for shaping the plasma current and hence this fourth embodiment utilizes a central core body to prevent concentration of the plasma current into a filament along the central axis of the channel. Therefore, in this fourth embodiment the gas is confined in an annular channel through which an electric sheet discharge is maintained in an axial direction.

The various accelerator components are mounted to an archead support structure 60, of generally annular configuration and fabricated from a suitable electrical insulating material, such as Micarta. The support structure 60 includes a larger diameter annular portion 60a contiguous with a smaller diameter annular portion 60b. A cylindrical core 65, of iron or other suitable metal, is fitted into the central aperture of the archead support structure 60 and projects therefrom. The cylindrical core 65 comprises a larger diameter portion 65a fitted into the central aperture of the archead support structure and coextensive therewith, and a smaller diameter portion 65b projecting from the archead support structure. The archead support structure, the cylindrical core, and certain of the hereinbelow described components are provided with numerous orifices and passageways for the flow of coolant fluids. However, since suitable methods and techniques for cooling plasma generator structures are well known in the art, in the interest of clarity such orifices and passageways are not shown in the drawings.

Extending axially through the archead support structure 60 are a plurality of circumferentially spaced openings 70, five of such openings being used in the illustrated embodiment of FIGURES 5 and 6. Each of the openings 70 terminates in an enlarged end portion 70a at the projecting end of the annular portion 60b of the archead support structure.

An annular anode plate 75, of varying thickness is mounted to the end of the projecting smaller diameter annular portion 60b of the archead support structure. The anode plate 75 is fabricated of metal, preferably copper, and is provided with a series of five circumferentially spaced cylindrical projections 75a, each of the cylindrical projections 75a mating with one of the enlarged end portions 70a in the archead support structure. The anode plate is provided with a series of five passageways 76, each of the passageways 76 extending coaxially through a different one of the cylindrical projections 76a. The openings 76 are tapered to form a sonic orifice 76a terminating in a supersonic nozzle 76b.

Mounted within each of the openings 70 is a cylindrical cathode 77 fabricated of a suitable metal, with tungsten being presently preferred. Each of the cathodes 77 defines a tapered end portion 77a projecting partially into the adjacent sonic orifice and in coaxial alignment therewith. Each of the cathodes 77 is energized by a separate power supply (not shown) connected between it and the anode plate 75.

The open volume defined between the tapered end portion 77a of each of the cathodes 77 and the tapered surfaces of the anode plate 75 defining the sonic orifices 76a forms a gas chamber. Plasma is produced within each of the gas chambers by pumping gas under pressure through suitable gas inlet passageways, not shown, in the archead support structure 60 and into each gas chamber, and through an arc maintained between the cathode 77 and the anode plate 75, the plasma then passing through the sonic orifices 76a and then being expanded in the contiguous supersonic nozzles 76b. Thus, five circumferentially spaced arc gap devices are provided within the archead support structure 60, each arc gap device being electrically energized by a separate power supply.

An annular, multi-segment, inner cooling jacket, generally indicated by the reference numeral 80, is fitted onto the projecting smaller diameter portion 65b of the cylindrical core 65. An insulating ring 78 is abutted against the shoulder defined by the projecting end surface of the larger diameter portion 65a of the cylindrical core and an insulating sleeve is coaxially mounted on the projecting smaller diameter portion 65b of the cylindrical core. Thus the inner cooling jacket 80 is insulated from the metallic core 65. The inner cooling jacket is comprised of a plurality of annular jacket segments, each segment being insulated from the adjoining segment by an insulating ring. Five such jacket segments are shown in the illustrating embodiment of FIGURES 5 and 6, the jackets being identified by the reference numerals 81–85. Each of the jacket segments 81–85 is a hollow, metallic annulus provided with a wall extending transversely across its interior space; by providing an inlet and an outlet on either side of the transverse wall and adjacent thereto a substantially circular flow of coolant can be established within each jacket segment. The inlets and outlets of the various jacket segments 81–85 are coupled to suitable manifolds, not shown, and thence through passageways extending through the archead support structure for coupling to a source of coolant under pressure. The jacket segment 81 is abutted against the insulating ring 78, the insulating ring 78 being provided with suitable openings coextensive with the supersonic nozzles defined in the anode plate. The jacket segment 81 is insulated from the adjacent jacket segment 82 by an insulating ring 86, similar insulating rings 87–89 separating the remaining jacket segments from each other.

An outer cooling jacket, generally indicated by the reference numeral 90, and similar in construction to the inner cooling jacket 80 but of larger diameter, is secured to the projecting end of the annular portion 60b of the archead support structure and abutted against the insulating ring 78. The outermost diameter of the cooling jacket 90 is substantially equal to the outer diameter of the annular portion 60b. The space between the inner surface of the cooling jacket 90 and the outer surface of the cooling jacket 80 defines an annular shaped accelerator channel. Thus, the five hereinabove described supersonic expansion nozzles empty directly into the accelerator channel. An insulating sleeve 91 is coaxially mounted onto the outer cooling jacket 90 and the smaller diameter annular portion 60b of the archead support structure. An annular magnetic field coil assembly 92 is coaxially disposed on the insulating sleeve 91 and abutted against the larger diameter annular portion 60a of the archead support structure.

The smaller diameter portion 65b of the cylindrical core 65 terminates in a threaded end portion 65c, into which is threaded a tapered cylindrical metallic afterbody 93, the afterbody 93 being generally toroidally shaped and having a flat end surface which is abutted against an insulating ring 94 disposed against the jacket segment 85 of the inner cooling jacket. The hollowed out central portion of the afterbody 93 is partially threaded adjacent its flat end surface so that the afterbody may be screwed onto the threaded portion 65c of the cylindrical core, the remaining portion of the inner surfaces of the afterbody defining a cylindrical opening terminating in an arcuate, generally toroidally shaped orifice 95. Within this central portion and adjacent the orifice 95 is disposed a tapered conical cathode 96, the cathode 96 being mounted to the projecting end of the threaded portion 65c of the cylindrical core. The cathode 96 is fabricated of tungsten or other suitable metal and is surrounded by an insulating plug 97 of a suitable buffering material, such as boron nitride. A passageway 98, as shown in FIGURE 5, extends through the buffering plug and communicates with a gas inlet passageway 99 extending longitudinally through the cylindrical core 65, the passageways 98 and 99 being for the purpose of injecting gas into the orifice 95. A suitable power supply is connected between the cathode 96 and the anode plate 75.

In the operation of the embodiment shown in FIGURES 5 and 6 a total of five arc jets are utilized to heat and partially ionize a gas flow which is then passed through the sonic orifices 76a, expanded in the adjacent supersonic nozzles 76b, and then passed through the annular shaped accelerator channel. A sheet electric discharge is maintained along the length of the accelerator channel by striking a discharge from the point of the cathode 96 at the orifice 95 to the exposed portions defining the supersonic expansion nozzles in the anode plate 75. The cross-sectional area of the accelerating channel can be changed by alteration of the outer diameters of the cooling jacket 90 and the afterbody 93, or by altering the inner most diameter of the cooling jacket 80, or both.

The accelerating discharge extending from the cathode 96 to the exposed portions of the anode plate 75 is in the form of a sheet due to the tapered toroidally shaped surface of the afterbody 93 and the circumferentially spaced anode portions. The injection of a small amount of gas over the buffered cone shaped cathode 96 causes operation of the cathode 96 in a highly confined spot mode of emission (similar to the operation of the arc jet cathodes) whereby the secondary cathode is capable of carrying currents up to about 2,500 amperes with a negligible amount of erosion or burn-off, this type of operation not being possible with the usual distributed thermionic type of emission. The injection of the cold gas on the surfaces of the afterbody tip 93 defining the orifice 95 pushes the sheet discharge away from the afterbody surface, as indicated by the dotted line arrows shown in FIGURE 5.

Insulation of each of the jacket segments of the inner and outer cooling jackets allows the establishment of the desired axial electric field along the channel as well as providing wall confinement of the plasma. Hall currents result from the spiraling of the electrons about the central core body formed by the inner cooling jacket 80 and the afterbody 93. The Hall currents interact with the axial components of the magnetic field created by electrical excitation of the field coil 92 to create radial forces on the charged particles which pull the discharge away from the outer wall (the inner wall of the outer cooling jacket 90). By proper placement of additional magnetic coils inside the core body another axisymmetric magnetic field can be established to push the discharge away from the outer surface of the inner cooling jacket 80.

There are four accelerating mechanisms acting upon the plasma passing through the accelerator structure of the FIGURES 5 and 6. First, the current density of the secondary electrical discharge extending out of the orifice 95 in the afterbody tip causes acceleration of the gas, thereby providing a "self-magnetic pumping" effect. Second, the Hall currents spiraling in the accelerator channel interact with the radial component of the magnetic field to accelerate the plasma. Third, expansion of the gas over the afterbody tip at the channel exit converts internal energy into directed kinetic energy. Fourth, the (negative) radial component of current of the second electrical discharge interacts with the axial component of the applied magnetic field to induce tangential Hall currents in the region of expanding current at the channel exit. These rotating Hall currents interact with the radial component of the applied magnetic field to accelerate the gas in the positive axial direction (through the channel outlet). Of these four accelerating mechanisms, the fourth has been found to provide the greatest accelerating force on the plasma.

Typical operating potentials for the embodiment shown in FIGURES 5 and 6 are similar to those utilized with the embodiments of FIGURES 1, 3 and 4, the five power supplies for the arc gap devices providing a voltage on the order of from about 40 to 150 volts, the power in the pre-ionizing arcs again being within the range of from about 2 to 50 kw. The conically shaped cathode 96 is maintained within the range of from about 200 to 1,000 volts below the anode 75, and therefore below the first cathodes. The plasma pressure within the accelerating channel is, as stated hereinabove, within the range of from about 1 to 10 mm. Hg.

Incorporation of the suggested modification of the embodiment shown in FIGURES 4 and 5, wherein creation of an inner axisymmetric magnetic field results in complete magnetic confinement of the plasma, will enable the attainment of extremely high current densities, on the order of several hundred thousand amperes per square centimeter, together with accelerating channel pressures on the order of from 10 to 100 atmospheres and temperatures on the order of $10^8$ to $10^{9°}$ K.

The gases utilized in all of the present invention accelerator embodiments should possess several distinct characteristics. The gases should have a relatively low ionization potential (less than about 16 volts) and a molecular weight greater than about 40. The gates should be non-corrosive and non-oxidizing, i.e., gases which will not attack metallic surfaces whether the gases are in ionic or atomic form. Examples of gases possessing these desirable characteristics are argon, nitrogen, cesium and lithium. Alternatively, a combination of gases may be used. The radians per collision of the ions must be practically insignificant when compared to the radians per collision of the electrons. For example, the ions should typically be within the range of 0.1 to 1.0 radian per collision while the electrons are typically within the range of from 100 to 1000 radians per collision. It is readily apparent that when utilizing a suitable mixture of gases, one of the gases is almost completely ionized while the other gas is nonionized. The ionized gas is preferably derived from an alkali metal, such as sodium or potassium.

Thus, there have been described novel plasma accelerator concepts wherein Hall currents are utilized to significantly increase the axial acceleration of a gas plasma. It is known that Hall currents are generated by current density lines crossing magnetic field lines, and that interaction of the Hall currents with the magnetic field will produce a force in the direction of the electric current flow. Hence, to utilize Hall currents to produce axial thrust, the applied current must flow axially and in the downstream direction and cross magnetic field lines. Accordingly, in the present invention embodiments of Hall current accelerators utilizing an axialsymmetric configuration, in order to achieve the desired axially downstream flow of current a cathode electrode is placed on the accelerator axis at the exit end of the accelerator channel and an anode electrode is placed upstream therefrom at the channel inlet. Connection of the cathode and anode electrodes to a suitable source of direct current enables an arc to be struck between them to establish the axial current flow through the accelerator channel, the anode electrode also being utilized as the anode electrode of arc jet apparatus which forms the ionized gas plasma at the channel inlet. An annular magnetic field coil or coils axially surrounding the accelerator channel provides strong radial magnetic lines of force for the axial current density to cross to generate the desired Hall currents. Since the strength of the radial components of the magnetic lines of force drop to zero at the axis of an annular field coil, some provision must be made to prevent this occurrence. When working at the lower ambient pressures where magnetic field strength has some effect upon the plasma path, an auxiliary rotating magnetic field can be utilized to prevent the formation of a current filament along the central axis of the device. Alternatively, when using a series of annular field coils to provide the fringe magnetic fields for acceleration of the plasma, the coils can be displaced from the central axis of the device, each coil being displaced transversely in a different direction. When operating at higher ambient pressures at which magnetic fields are ineffective in shaping the plasma, a cylindrical elongate body can be coaxially disposed in the accelerator channel to provide a center core along the axis of the device. When utilizing the center core body a plurality of arc jet devices are circumferentially disposed around the center core body at the device inlet, the cathode for the accelerating discharge being disposed on the tip of the center body and on the device axis. Accordingly, a tubular sheath accelerating discharge will be obtained, and the axial symmetry of current flow retained.

The hereinabove described techniques and embodiments are predicated upon the use of magnetic field interactions, rather than gas dynamic forces, to develop the main axial accelerating force for the gas plasma. Predominance of the magnetic field interactions over the gas dynamic forces can be achieved by establishing the conditions specified in Equations 9 and 10 and, as pointed out in the discussion of the mathematical derivations, as long as $\omega_I \tau_I < 1$, the magnitude of the axial acceleration is independent of the magnitude of the applied magnetic field, assuming compliance with the conditions specified in Equations 9 and 10. Therefore, it can be seen that the desired predominance of magnetic field interactions can be achieved by maintaining $\omega \tau$ greater than unity for the electrons in the plasma and less than unity for the ions in the plasma.

Although the invention has been described with a certain degree of particularity, it is understood that the present disclosure has been made only by way of example

What is claimed is:
1. A plasma accelerator comprising, in combination:
(a) Tubular casing means having an axisymmetric supersonic expansion nozzle therein extending longitudinally between a sonic orifice inlet and a nozzle outlet, the longitudinal axis of said nozzle defining a reference axis for the accelerator;
(b) An arc gap device disposed adjacent said sonic orifice inlet for at least partially ionizing a gas stream and injecting the resulting gas plasma axially into said sonic orifice inlet, said arc gap device including a first cathode electrode and an anode electrode between which a first electric discharge is maintained to partially ionize said gas stream;
(c) Means for maintaining an axisymmertic second electric discharge extending axially through said nozzle between a second cathode electrode disposed at the nozzle outlet and said anode electrode of said arc gap device, whereby a plasma jet defining an axial current flow through said nozzle is established;
(d) Means for establishing a rotating first magnetic field within a first predetermined longitudinal portion of said nozzle, said first magnetic field rotating about said reference axis substantially transversely thereto; and
(e) Means for maintaining a second magnetic field within a second predetermined longitudinal portion of said nozzle, said second magnetic field being axisymmetric with respect to said reference axis and strongly fringing so that the total radial components of the magnetic lines of force of said second magnetic field greatly predominate over the axial components of the magnetic lines of force of said second magnetic field and cross the current density lines of the axial current flow of said plasma jet through said nozzle, the field strength of said second magnetic field being sufficiently strong with respect to the ambient pressure in said nozzle so that the magnetic field interactions predominate over the gas dynamic forces to axially accelerate said plasma jet through said nozzle.

2. A plasma accelerator comprising, in combination:
(a) Tubular casing means defining an inlet end and an outlet end, the longitudinal axis of said casing means defining a reference axis for the accelerator;
(b) An elongate cylindrical center body means concentrically disposed within said tubular casing means and extending from said inlet end toward said outlet end to thereby define an elongate accelerator channel of annular cross-section;
(c) Means for at least partially ionizing a gas stream and injecting a tubular gas plasma coaxially into the inlet of said accelerator channel;
(d) Means for maintaining an axisymmetric electric discharge extending coaxially through said accelerator channel between said outlet end and said inlet end to thereby establish a tubular plasma jet defining an axial current flow through said accelerator channel; and
(e) Means for maintaining a magnetic field throughout said accelerator channel, said magnetic field being axisymmetric with respect to said reference axis and strongly fringing so that the total radial components of the magnetic lines of force of said magnetic field greatly predominate over the axial components of the magnetic lines of force of said magnetic field and cross the current density lines of the axial current of said plasma jet through said accelerator channel, the field strength of said magnetic field being sufficiently strong with respect to the ambient pressure in said accelerator channel so that the magentic field interactions predominate over the gas dynamic forces to axially accelerate said plasma jet through said accelerator channel.

3. A plasma accelerator comprising, in combination:
(a) Tubular casing means defining an inlet end and an outlet end, the longitudinal axis of said casing means defining a reference axis for the accelerator;
(b) An elongate cylindrical center body means concentrically disposed within said tubular casing means and extending from said inlet end toward said outlet end to thereby define an elongate accelerator channel of annular cross-section;
(c) A plurality of arc gap devices disposed circumferentially about said center body at the inlet of said accelerator channel for at least partially ionizing a gas stream and injecting the resulting gas plasma axially into said accelerator channel, each of said arc gap devices including a first cathode electrode and an anode electrode between which a first electric discharge is maintained to partially ionize said gas stream;
(d) Means for maintaining a tubular axisymmetric sheet second electric discharge extending axially through said accelerator channel between a second cathode electrode coaxially mounted to the end of said center body nearest said outlet end and the anode electrodes of said arc gap devices, whereby a tubular plasma jet defining an axial current flow through said accelerator channel is established; and
(e) Means for maintaining a magnetic field throughout said accelerator channel, said magnetic field being axisymmetric with respect to said reference axis and strongly fringing so that the total radial components of the magnetic lines of force of said magnetic field greatly predominate over the axial components of the magnetic lines of force of said magnetic field and cross the current density lines of the axial current flow of said plasma jet through said accelerator channel, the field strength of said magnetic field being sufficiently strong with respect to the ambient pressure in said accelerator channel so that the magnetic field interactions predominate over the gas dynamic forces to axially accelerate said plasma jet through said accelerator channel.

4. The plasma accelerator defined in claim 3 wherein said second cathode is generally conically shaped with the pointed end projecting toward the channel outlet.

5. The plasma accelerator defined in claim 3 wherein the inner circumferential surface of said tubular casing means and the circumferential surface of said center body each define a longitudinal series of circular electroconductive segments, each of said segments being electrically insulated from the other segments to thereby facilitate establishment of an electrical potential difference in the tubular plasma between the inlet and outlet ends of said accelerator channel.

References Cited by the Examiner
UNITED STATES PATENTS

| 2,946,914 | 7/1960 | Colgate et al. | 313—231 |
| 2,992,345 | 7/1961 | Hansen | 315—111 X |
| 3,029,635 | 4/1962 | Fetz | 313—231 X |

CARLTON R. CROYLE, *Primary Examiner.*

MARK NEWMAN, *Examiner.*

UNITED STATES PATENT OFFICE
CERTIFICATE OF CORRECTION

Patent No. 3,309,873                          March 21, 1967

Gordon L. Cann

It is certified that error appears in the above identified patent and that said Letters Patent are hereby corrected as shown below:

Column 1, between the first and second paragraphs insert -- The invention described herein was made in the performance of work under a NASA contract and is subject to the provisions of Sections 305 of the National Aeronautics and Space Act of 1958, Public Law 85-568, (72 Stat. 435; 42 USC 2457). --.

Signed and sealed this 21st day of October 1969.

(SEAL)
Attest:

Edward M. Fletcher, Jr.                      WILLIAM E. SCHUYLER, JR.
Attesting Officer                                 Commissioner of Patents